Feb. 26, 1952        P. F. ELARDE        2,586,799
DRIFT CONTROLLED FLUXMETER
Filed June 10, 1948
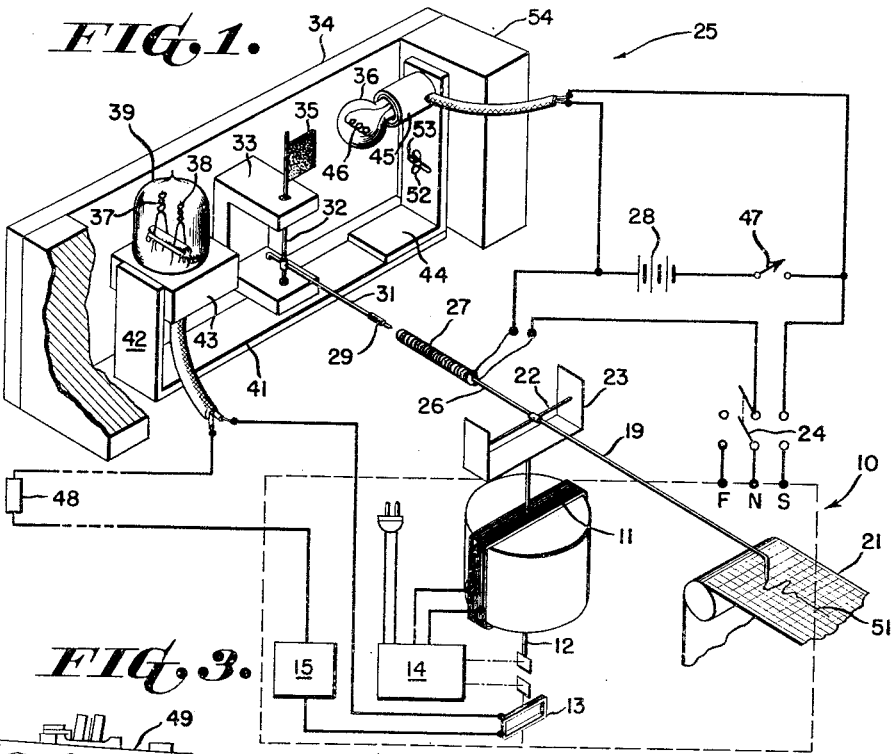
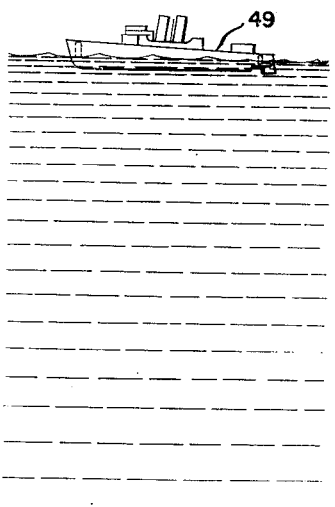
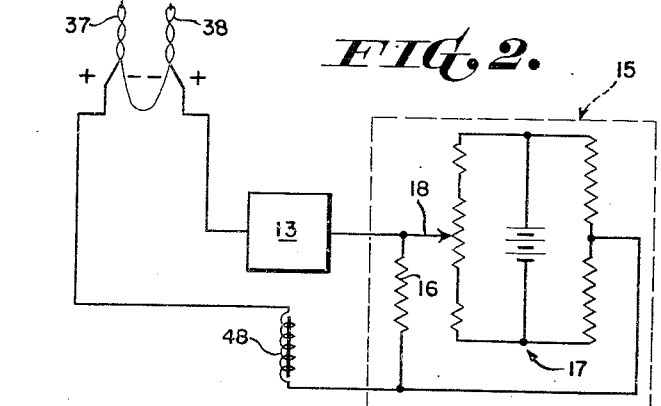
Inventor
P. F. Elarde
M. O. Hayes
By
Attorney Patented Feb. 26, 1952

2,586,799

UNITED STATES PATENT OFFICE 2,586,799

DRIFT CONTROLLED FLUXMETER

Paul F. Elarde, Westchester, Ill.

Application June 10, 1948, Serial No. 32,248

13 Claims. (Cl. 346—32)

(Granted under the act of March 3, 1883, as amended April 30, 1928; 370 O. G. 757)

This invention relates generally to recording devices having torsionless moving coil systems such, for example, as fluxmeters and more particularly to improvements therein for controlling drift of the torsionless coil or element of such systems. The expression "torsionless coil" or "element" as employed herein defines a moving coil system in which there are no means provided for restoring the coil to a null position whereby the coil is adapted to be moved to different settings, and to hold these settings, selectively in accordance with the polarity and magnitude of the electrical signals applied to the coil.

A major problem in connection with the use of fluxmeters or other torsionless instruments is the drifting of the torsionless element in response to minute electromotive forces such as may be introduced into the recording system by thermal or chemical changes. Shocks and vibration may also cause spurious movement of the torsionless element. Thus, in the case of a bank of fluxmeters such as may be employed in a range installation for measuring and recording the magnetic signatures of vessels moving within the range, the problem in avoiding the recording of magnetic variations which are not true representations of the magnetic signatures reaches such proportions as to require the use of means for effectively preventing drift of the torsionless element.

A magnetic signature of a vessel may be regarded herein as the variation of intensity of the magnetic field of the vessel along a vertical plane extending longitudinally of the vessel. Thus, a pickup coil disposed beneath the vessel on the range and provided with a core of "Permalloy" or other material having a high initial permeability to weak fields and comprising a large number of turns of wire wound about the core will generate an electrical signal whose magnitude varies in proportion to the magnetic signature of the vessel as the intensity of the vessel's field varies upon movement of the vessel over the pickup coil. The signal generated by the pick-up coil is utilized to drive the moving coil system of a recording fluxmeter the pen of which is thus caused to leave a permanent record of the vessel's magnetic signature.

A drift control device heretofore devised for use with a fluxmeter to prevent drift thereof employs a lamp and thermocouple so constructed and arranged that the back of the fluxmeter pen casts a shadow between the thermocouple junctions when no electrical signal is generated in the pick-up coil. The thermocouple is connected in the signal circuit of the recording system such that when the recording pen drifts from the null position on the recording tape due, for the most part, to thermal and/or sea battery or galvanic currents in the signal circuit, the shadow of the pen falls across one or the other of the thermocouple junctions to cause a compensating electromotive force to develop in the signal circuit sufficient to return the pen toward the null position thereof.

Such a drift control device has not been found to be entirely satisfactory under all conditions of service for the reason that the compensating voltage produced by the drift control device during the interval that the ship is passing over the pick-up coil is introduced into the signal circuit variably and compensates or alters the signal with the result that the recorded signal is no longer a true representation of the magnetic signature, this condition being particularly true when the control is compensating an excessive drift just prior to measurement of the signature.

The introduction of a drift control or compensating voltage into the recording system of the prior device could be delayed by altering the heat capacity of the junctions of the thermocouple, but such delayed control would be sluggish and a sudden drift of the pen would cause the pen to move out of the small control region provided between the pen and the thermocouple.

In accordance with the present invention, a drift controlled recording fluxmeter is provided which retains all of the advantages of the prior fluxmeters of this general type and possesses none of the foregoing disadvantages. More specifically, the present invention provides a new and improved drift control arrangement which is generally similar to the foregoing thermocouple control and provides a pair of thermocouples connected electrically opposing in the signal circuit of the recording system, and a movable light-controlling element for applying a light source equally to the thermocouples when the element is in a null position corresponding to the null position of the recording pen, thereby to electrically balance the signal circuit in the absence of a signal. When the light-controlling element is moved to shadow one or the other of the thermocouples, a voltage is injected into the signal circuit to return the pen toward the null position. This arrangement is utilized to compensate for drift of the pen by coupling the light-controlling element to the pen without making physical connection therewith for follow-up movement with respect to the pen, thereby to provide a continuous and full-scale drift control effective to automatically return the pen toward null position in response to drifts prior to the recording of the magnetic signature of the ship.

As the ship moves into the vicinity of the pick-up coil, the light-controlling element is decoupled from the pen without changing the position of the element whereby the element is effective to cause the thermocouples to inject a voltage selectively into the signal circuit sufficient to compensate for the thermal and/or galvanic drift producing currents present in the circuit just prior to decoupling the element. By decoupling the element from the pen during the signal recording interval, the signal circuit is effectively energized substantially only by the signal voltage produced by the pick-up coil and the drift controlled recording system of the present invention thus avoids compensating the signal. The compensating voltage continuously injected into the signal circuit during the signal recording interval, however, compensates for the drift producing currents therein for the reason that these currents do not vary appreciably during this interval which is relatively short and usually in the order of 60 seconds. The time between recording intervals is relatively long and is usually in the order of ten minutes, this being the time required for the vessel to maneuver prior to moving over the range. The drift producing currents may vary considerably during the interval between recordings and for this reason the follow-up drift control system of the present invention, in which thermocouples having characteristics providing rapid response may be employed, provides substantially instantaneous correction of the drift of the pen sufficient to maintain it at all times within the control range of the light-controlling element regardless of the magnitude or rate of change of the drift.

An object of the present invention is to provide a new and improved recording fluxmeter having provision for automatic drift compensation whereby the fluxmeter is rendered suitable for use in recording a true representation of the magnetic signature of a vessel.

Another object of the present invention is to provide a new and improved torsionless fluxmeter having provision for automatically compensating for the drift of the torsionless element of the fluxmeter prior to recording a signal thereon.

Still another of the objects is to provide a new and improved drift control means for compensating spurious currents in the torsionless element of the fluxmeter during a signal recording interval without applying the drift control current to the signal.

A further object is to provide an automatic drift control for a torsionless fluxmeter having provision for selectively coupling the drift control mechanism to the pen of the fluxmeter without making physical contact therewith and having provision for continuing compensating control of spurious currents causing drift of the fluxmeter after the drift control has been decoupled without causing compensation of the pen movement in response to a signal.

Other objects and many of the attendant advantages of this invention will be readily appreciated as the same becomes better understood by reference to the following detailed description when considered in connection with the accompanying drawing wherein:

Fig. 1 illustrates in diagrammatic form a complete electrical system for the drift controlled fluxmeter according to a preferred embodiment of the invention;

Fig. 2 is an electrical diagram of the fluxmeter signal circuit including the pick-up coil and balancing circuit; and Fig. 3 is a diagrammatic view illustrating the pick-up coil arranged on the bed of a body of water within the path of travel of a vessel in a manner to generate a voltage indicative of the magnetic signature of the passing vessel.

Referring now to the drawings in which like numerals of reference are employed to designate like parts throughout the several views, there is shown in Fig. 1, a recording fluxmeter generally designated 10 which may be of any type suitable for the purpose such, for example, as the recording fluxmeter, catalog No. 32C120, manufactured by the General Electric Co. which comprises the usual pen driving or "slave" coil 11 having a pivot shaft 12 upon which the slave coil is supported to follow the movement of the signal responsive or "master" coil 13, the master and slave coils having the usual photo-electric and mirror driving systems generally designated by the numeral 14 cooperatively associated therewith to provide the follow up movement therebetween.

The fluxmeter also comprises the usual pen control or balancing circuit generally designated 15 and including the shunt 16 and bridge circuit 17 which operates upon adjustment of wiper 18 thereof to supply a current of the proper polarity and magnitude to the master coil to cause movement thereof sufficient to change the position of the recording pen 19 with respect to the recording tape 21, i. e., to restore the pen to a null or zero position on the tape.

The pen carries a cross arm or shaft 22 which is journalled in the U-shaped bracket 23 which, in turn, is secured to the end of shaft 12.

The fluxmeter also comprises external terminals designated F, N, and S which are connected to one side of a DPDT switch 24 such that, when the switch is thrown to the left as viewed in Fig. 1, the recording tape is driven at a predetermined "fast" speed such, for example, as six inches per minute; when the switch is open or in the "neutral" position thereof, the tape is at rest; and when the switch is thrown to the right, the tape is driven at a predetermined "slow" speed such, for example, as 2.674 inches per hour, respectively.

A drift control generally designated 25 is employed to prevent drift of the recording pen in response to spurious thermal and/or chemical currents generated in the signal circuit of the master coil. Otherwise stated, the drift control is employed to automatically maintain the recording pen at any desired zero position against any thermal and chemical electromotive forces which may be developed in the signal circuit. To this end, the back end 26 of the pen is arranged in any suitable manner, not shown, to carry a small coil of wire 27 which is adapted, when energized from the battery 28, to magnetically attract the ferro-magnetic tip 29 which is carried by the pivoted non-magnetic pointer 31 in close proximity to one end of the coil, thereby to cause the pointer to follow the movement of the pen without making physical contact therewith. The coupling thus provided between the pointer and pen without the use of magnetic materials except for the small tip 29 avoids spurious magnetic influences on the fluxmeter, particularly in the case of fluxmeters wherein the torsion controlling permanent magnet for the master coil is located in close proximity to the recording pen as in the case of the aforementioned General Electric fluxmeter.

Pointer 31 is secured to a vertical shaft 32 which is journalled in the C-shaped bracket 33, the bracket being secured along the vertical leg thereof in any suitable manner to a supporting frame 34 which is rigidly mounted on any convenient portion of the fluxmeter adapted to provide the aforementioned proximate spaced relation between the pointer and the pen, the pointer and pen being in the aligned positions illustrated in Fig. 1 when the pen is in the null or zero position thereof.

Shaft 32 carries a flag 35 at right angles to pointer 31 for controlling the light applied from a lamp 36 to the junctions 37 and 38 of a conventional vacuum thermocouple tube 39. Tube 39 is mounted on a base 43 supported on the upstanding leg 42 of a base 41 which is secured in any suitable manner to bracket 33 for pivotal movement about the axis of shaft 32. The other end of base 41 carries an L-shaped bracket 44 which supports the socket 45 for the lamp 36.

Lamp 36 has a horizontally disposed filament 46 which is energized from battery 28 when a switch 47 is closed, and the junctions of the thermocouple tube are arranged transversely of the base 41 such that the flag, when in the null position illustrated in Fig. 1, casts a shadow between the thermocouple junctions. When a drift electromotive force is generated in the signal circuit of the master coil, the pen and coupling coil supported thereon rotate and cause the pointer to rotate through a corresponding angle when the coupling coil is energized. This causes movement of the flag and lengthening of the shadow toward one of the thermocouple junctions with the result that unequal electromotive forces (E. M. F.'s) are generated by the junctions of the thermocouple tube. The thermocouple junctions are connected electrically opposing in the signal circuit of the master coil such that the thermocouple tube causes a differential E. M. F. to be injected into the circuit, which E. M. F. opposes the E. M. F. causing the drift. When the shadow moves sufficiently to bring the thermocouple E. M. F. into equaltiy with the drift E. M. F., drifting movement of the pen ceases, this usually occurring before the pen has moved appreciably. In laboratory tests, a pen deflection of one half division on the recording tape was found sufficient to compensate for the heaviest drifts encountered.

As the drift slowly changes, the shadow moves to keep the compensating E. M. F. equal and opposite to the drift E. M. F. This action may be regarded as "dynamic drift compensation,' and, obviously, this action would cause compensation of a signal to be recorded by the fluxmeter such, for example, as the signal generated by the pick-up coil 48 when arranged as in Fig. 3 to generate an electrical signal indicative of the magnetic signature of the passing vessel 49 and when connected in series in the signal circuit of the master coil, as best illustrated in Fig. 2 of the drawing, whereby the fluxmeter is caused to produce a permanent record of the signature 51 on the recording tape.

Switch 24 is employed to change the drift control from "dynamic drift compensation" to "static drift compensation" concurrently with changing the speed of the tape from slow to fast speed preparatory to recording the ship's signature on the tape, the terminals on the side of switch 24 opposite terminals N, S being connected in the circuit of battery 28 and coil 27 whereby the pointer 31 is decoupled from the recording pen when switch 24 is thrown to fast speed.

Upon decoupling the pointer, flag 35 remains stationary and thus causes the thermocouple to inject a constant E. M. F. into the signal circuit sufficient to compensate the drift E. M. F. in the circuit just prior to decoupling of the pointer, this being the case notwithstanding movement of the pen in response to the signal voltage injected into the signal circuit by the pick-up coil. "Static drift compensation" is thus applied to the master coil to prevent drift of the recording pen as long as the drift E. M. F. is constant. This condition normally prevails for at least a few minutes, which usually provides sufficient time to obtain a recording which is a true representation of the ship's magnetic signature, the signal recording interval being in the order of sixty seconds.

When it is desired to change the null or zero position of the pen on the recording tape, this may be accomplished in any suitable manner such, for example, as by pivotally moving base 41 about the axis of staff 32. The base is releasably locked in the adjusted positions thereof as by a screw 52 which extends through the elongated slot 53 in L-shaped bracket 44 and threaded into member 54 of the supporting frame. When the base 41 is thus moved from the null position of Fig. 1, for example, the flag does not change position and, therefore, shadows one of the thermocouple junctions which thereupon injects a voltage in the signal circuit to cause a shift of the pen sufficient to move the flag into a null position with respect to the thermocouple junctions, i. e., the flag again casts a shadow between the junctions.

From the foregoing, the operation of the aforedescribed elements of the improved fluxmeter should now be apparent. Accordingly, the operation of the several parts merely will be alluded to in the following general statement of the operation of the fluxmeter in recording the signature of ship 49.

Prior to recording the signature, switch 47 is closed and switch 24 is thrown to its "slow" position. Base 41 is adjusted to bring the pen into the zero position illustrated in Fig. 1, for example, and, in the event that the electrical outputs of the thermocouple junctions are unequal, wiper 18 of the balance circuit 15 is adjusted to restore the pen to the desired zero position. The fluxmeter is now operating under "dynamic drift compensation."

When the vessel is coming over the range, switch 24 is thrown to its "fast" position, thereby simultaneously to move the tape at high speed and to deenergize coil 27 whereupon the pointer 31 and flag 35 are decoupled from the pen. Switch 47, however, is retained in closed position whereby the drift control is effective to inject a drift compensating E. M. F. into the signal circuit in accordance with the last moved position of the flag, thus placing the fluxmeter under "static drift compensation."

When the signal has been recorded, the fluxmeter is again returned to "dynamic drift compensation" operation by throwing switch 24 to its "slow" position whereupon the pointer 31 and flag 35 are again coupled to the pen for follow-up movement with respect thereto as the thermal or galvanic currents in the signal current vary to cause drift of the pen.

Obviously many modifications and variations of the present invention are possible in the light of the above teachings. It is, therefore, to be understood that within the scope of the appended claims the invention may be practiced otherwise than as specifically described.

The invention may be manufactured and used by or for the Government of the United States of America for governmental purposes without the payment of any royalties thereon or therefor.

What is claimed as new and desired to be secured by Letters Patent of the United States is:

1. In a recording fluxmeter of the character disclosed, the combination of means including an element constructed and arranged for follow-up movement with respect to the recording pen of the fluxmeter, means responsive to the the movement of said element to different positions for providing dynamic drift compensation of the pen movement, and means for rendering said element ineffective to follow the movement of the pen as the pen moves in response to a signal to be recorded by the fluxmeter, said element being constructed and arranged to maintain the last moved position thereof when said follow-up movement is rendered ineffective whereby said dynamic drift compensation means provides static drift compensation of the pen during the signal recording interval and while the element is stationary, and dynamic compensation of the pen movement is avoided during said signal recording interval.

2. A drift control for a fluxmeter having a signal responsive circuit and a recording pen adapted to be moved from a null position variably in accordance with the magnitude and polarity of the electromotive forces in said circuit comprising, in combination, a thermocouple having a pair of junctions connected electrically opposing in said circuit for injecting an electromotive force therein sufficient to compensate for drift of the pen when the junctions are unequally subjected to light rays, a light source in spaced relation with respect to said thermocouple, means including an element releasably coupled to the pen and interposed between said junctions and said light source for projecting the rays of the light source unequally on said junctions when the pen is moved away from said null position thereof, means for decoupling said element from the pen thereby to retain the element in the last moved position thereof for static drift compensation of the fluxmeter when a signal is to be recorded thereby, and adjustable balancing means connected in said circuit for injecting therein an electromotive force of magnitude and polarity sufficient to balance the electrical outputs of said junctions when said rays thereon are equally divided therebetween.

3. A fluxmeter system of the character disclosed for recording the magnetic signature of a vessel and comprising a fluxmeter having a torsionless moving coil, a pen, a driving coil for the pen, and means for driving said pen driving coil in response to movement of the torsionless coil, a pick-up coil electrically connected to said torsionless coil for generating a signal voltage corresponding to said signature as the vessel passes over the said pick-up coil, a pair of thermocouples connected electrically opposing with respect to each other and in series circuit with said torsionless and said pick-up coils, a light source, a pivoted flag interposed between said light source and thermocouples and having a null position in which the light from the light source falls equally on both of the thermocouples and a plurality of different moved positions in which a shadow is caused to fall on one of the thermocouples selectively in accordance with the direction of movement of the flag away from said null position, means for coupling said flag to said pen for follow-up movement with respect thereto without making physical contact therewith whereby the flag is moved by the pen as the pen drifts from an initial position in response to spurious thermal and galvanic currents in said circuit, the other one of said thermocouples injecting a voltage into the circuit sufficient to compensate said spurious currents as the flag moves from said null position, and means for decoupling said flag from the pen when a signature is to be recorded without changing the setting of the flag thereby to compensate for said spurious currents during recording of the signature and without compensating the recorded signal voltage.

4. In a recording fluxmeter of the character disclosed, a torsionless coil, a circuit including said coil, a recording pen adapted to be moved variably by said coil in accordance with the electromotive forces generated in said circuit, a thermocouple tube having a pair of junctions connected electrically opposing in said circuit, a light source for casting rays of light equally on said junctions, a pivoted flag interposed between said tube and said light source so as to cause a shadow to fall between said pair of junctions when the flag is in an initial position and to cause the shadow to lengthen over one of the junctions selectively in accordance with the direction of movement of the flag away from the initial position thereby to cause the tube to inject into said circuit an electromotive force of a magnitude proportional to the amount of pivotal movement of the flag away from said initial position and of a polarity controlled by the direction of the movement thereof, a coil of wire carried by said pen for movement therewith, an element of magnetic material carried by said flag for movement therewith and arranged in close proximity to said coil whereby the flag is caused to follow the movement of the pen in response to the magnetic attraction between the coil and the element when the coil is energized, and means including a switch for energizing the coil thereby to couple the flag to the pen while the switch is closed.

5. A drift control for a fluxmeter having an operating circuit and a recording pen adapted to be moved from a null position variably in accordance with the magnitude and polarity of the electromotive forces in said circuit comprising, in combination, a thermocouple having a pair of junctions connected electrically opposing in said circuit, a light source, a flag pivotally mounted between said light source and said junctions and movable selectively from a null position in which the light from the light source falls equally on said junctions to a plurality of moved positions in which a shadow is cast by the flag on one of the junctions selectively in accordance with the direction and magnitude of the movement of the flag away from said null position, means for releasably coupling the flag to the pen to cause the flag to move from the null position selectively in accordance with the direction and magnitude of the drift of the pen from the null position thereof in response to spurious currents in said circuit thereby to cause the thermocouple to induce a compensating voltage into said circuit of such magnitude and polarity as to null said spurious currents, means for supporting the light source and thermocouple as a unit for pivotal movement about the pivot axis of the flag whereby the flag may be caused to shadow either one of said junctions selectively as the supporting means is pivotally moved about said flag pivot without changing the position of the flag with respect to the pen, and means for releasably locking said supporting means in an angularly moved position such that the pen is in a new predetermined null position as the flag is restored to said null position thereof with respect to said junctions.

6. A fluxmeter recording system of the character disclosed for recording the magnetic signature of a moving vessel comprising, in combination, a fluxmeter having a movable torsionless master coil, a slave coil movable in response to movements of said master coil, a coupling coil, a pen movable with said slave coil and having said coupling coil carried thereby for movement therewith, a pick-up coil arranged in the path of travel of the vessel and electrically connected to said master coil for generating a signal voltage corresponding to the signature of a vessel as the vessel passes over the pick-up coil, a pair of thermocouples connected in series circuit with said master coil and said pick-up coil and electrically opposing with respect to each other, a light source, a pivoted flag disposed between said light source and the thermocouples and movable in either direction from an initial position in which the light from the light source is divided by said flag and falls equally on both of the thermocouples to a plurality of different moved positions in which the flag casts a shadow on one of the thermocouples selectively in accordance with the direction of movement of the flag away from said initial position, a tip of magnetic material secured to said flag adapted to follow said coupling coil only when the coupling coil is energized whereby the flag is caused to follow the movement of the pen as the pen drifts from an initial position in response to spurious thermal and galvanic currents in said series circuit thereby to cause the other one of said thermocouples to inject a compensating voltage into said circuit sufficient to null said spurious currents, and means including a switch for energizing said coupling coil as the switch is closed.

7. A fluxmeter recording system of the character disclosed for recording the magnetic signature of a vessel comprising, in combination, a fluxmeter having a torsionless moving coil, a pen, a driving coil for the pen, means for driving said pen driving coil in response to movement of the torsionless coil, a pick-up coil electrically connected to said torsionless coil for generating a signal voltage corresponding to said signature as the vessel passes over the pick-up coil, a pair of thermocouples connected electrically opposing with respect to each other, a circuit connecting said thermocouples in series with said torsionless coil and said pick-up coil, a light source, a pivoted flag interposed between said light source and said thermocouples and movable from a null position in which the light from the light source falls equally on both of the thermocouples to a plurality of different moved positions in which a shadow is cast by the flag on one of the thermocouples selectively in accordance with the direction of movement of the flag away from said null position, means for coupling said flag to said pen for follow-up movement with respect thereto without making physical contact therewith whereby the flag is moved as the pen drifts from an initial position in response to spurious thermal and galvanic currents in said circuit, the other one of said thermocouples injecting a voltage into the circuit sufficient to compensate said spurious currents, and means for de-coupling the pen from the flag when a signature is to be recorded without changing the setting of the flag prior to de-coupling thereby to compensate for said spurious currents during recording of the signature without compensating the recorded signal voltage.

8. A drift controlled fluxmeter having a signal responsive circuit and a recording pen adapted to be moved from a null position variably in accordance with the magnitude and polarity of the electromotive forces generated in said circuit comprising, in combination, a thermocouple tube having a pair of junctions connected electrically opposing in said circuit, a light source, a pivoted flag arranged between said tube and said light source and movable from a null position in which a shadow is cast between said pair of junctions and to cause the shadow to lengthen over one of the junctions selectively in accordance with the direction and magnitude of movement of the flag away from said null position thereby to cause the tube to inject into said circuit an electromotive force proportional to the magnitude of said movement of the flag and of a polarity controlled by the direction of movement thereof, a coil of wire carried by said pen for movement therewith, an element of magnetic material carried by said flag for movement therewith and arranged in close proximity to said coil whereby the magnetic attraction therebetween when the coil is energized causes the flag to follow the movement of the pen as the pen drifts from a null position in response to spurious thermal and galvanic currents in said circuit, a recording tape arranged to be marked by said pen, and means including a two position switch for energizing said coil and concurrently therewith for driving said tape at a slow speed when the switch is moved to one of said positions thereof and for deenergizing the coil and concurrently therewith driving said tape at a high signal recording speed when the switch is moved to the other position thereof whereby no change in the compensating voltage is injected into the circuit during the recording of a signal.

9. A system of the character disclosed for recording the magnetic signature of a vessel and comprising a fluxmeter having a movable recording element, a closed operating circuit for the fluxmeter, a source of light rays, a thermocouple device interposed in the path of said rays and comprising two thermocouple units opposedly connected in said circuit for injecting a voltage therein of a magnitude and polarity selectively in accordance with the difference in the degree of illumination of said thermocouple units from said source, and means flux-coupled to the recording element and interposed in the path of said rays between said thermocouple units and said source for controlling the degree of illumination of each of said thermocouple units selectively in accordance with the movement of said element thereby to inject a voltage in said circuit sufficient to compensate for movement of the recording element caused by thermal currents set up in the circuit.

10. A system of the character disclosed for recording the magnetic signature of a moving vessel and comprising a pickup coil, a pen recording fluxmeter for recording variations in the magnetic signature of said vessel picked up by the coil as the vessel moves thereacross, a circuit for operatively connecting the fluxmeter to the pickup coil, a thermocouple device comprising two opposedly connected thermocouple elements connected in series in said circuit with the pickup coil and the fluxmeter for generating combined voltages of different magnitudes and of either polarity selectively in accordance with the difference in degree of illumination of said elements, a source of light rays for illuminating said elements, a pivoted baffle plate arranged intermediate said elements and said source of light for reducing the light at either one of said elements selectively in accordance with the direction and degree of movement of said baffle from an initial position thereof, an actuating arm connected to said baffle, electromagnetic means for coupling the pen to the arm magnetically when the electromagnetic means is energized whereby the baffle plate is moved from said initial position to a moved position selectively in accordance with the direction and degree of movement of the pen from a null position thereof by thermal currents flowing through the fluxmeter, the thermocouple elements being so connected in the circuit as to cause the combined voltage generated thereby to oppose and null said thermal currents, means for energizing said electromagnetic means, and means for de-energizing the electromagnetic means thereby to disconnect the pen from said actuating arm while a ship's signature is being recorded.

11. In a pen recording fluxmeter system of the character disclosed for nulling thermal currents causing drift of the pen from the null position thereof comprising, in combination, an operating circuit for the fluxmeter, a thermocouple device having a pair of junctions electrically opposing each other and connected in said circuit for injecting a voltage therein of a magnitude and polarity selectively in accordance with the difference in the values of illumination individual to said junctions, means including a light source and a movable flag for unequally illuminating said junctions from said light source selectively in accordance with the movement of said flag away from an initial position in which the junctions are equally illuminated from said source, and electromagnetic means for coupling said flag to said pen for follow-up movement therewith away from said initial position as the pen drifts from said null position thereof whereby said device injects a voltage in said operating circuit sufficient to null said thermal currents.

12. In a system of dynamic and static drift compensation for a pen recording fluxmeter having a torsionless signal responsive coil and a pen driving coil controlled thereby, the improvement comprising a light source, a pair of opposedly connected thermocouples normally exposed equally to the heat radiated from said source, a circuit connecting said thermocouples in series with said signal responsive coil, an element magnetically coupled to the pen of the recording meter for dynamic drift compensation thereof and arranged to progressively decrease the heat received by either one of said thermocouples from said source as the element is moved by the pen selectively in either direction from a null position thereof in response to spurious galvanic and thermal currents received by said signal responsive coil, the other one of said thermocouples injecting a voltage in said circuit sufficient to null said spurious currents, and means for decoupling said element from said pen thereby to retain the element in the moved position thereof for static drift compensation of the fluxmeter when a signal is to be recorded thereby.

13. In a dynamic and static drift control apparatus for a recording fluxmeter, the combination of a light source, a pair of thermocouples arranged along a line normal to a line extending from the light source to a point on said first line midway between the thermocouples, a flag, a pivot support for said flag located on said normal line intermediate the light source and the thermocouples, said flag normally being aligned with the normal line so as to cast a shadow between the thermocouples and being so constructed as to lengthen the shadow over either one of the thermocouples as the flag is pivoted selectively to either side of the normal line, a closed operating circuit for the fluxmeter having said thermocouples connected in opposing relation therein, electroresponsive magnetic means effective when energized to couple the flag to the pen of the fluxmeter for follow-up movement with respect thereto as the pen drifts, the other one of said thermocouples injecting a voltage in said circuit sufficient to compensate for said drift of the pen as the flag is moved thereby to shadow said one of the thermocouples thereby to provide dynamic drift compensation, and means including a switch for energizing said magnetic means when the switch is closed, said flag retaining said moved position when the switch is open thereby to provide static drift compensation.

PAUL F. ELARDE.

REFERENCES CITED

The following references are of record in the file of this patent:

UNITED STATES PATENTS

| Number | Name | Date |
|---|---|---|
| 2,054,672 | Edgar | Sept. 15, 1936 |
| 2,326,880 | Norrman | Aug. 17, 1943 |
| 2,356,579 | Gardner | Aug. 22, 1944 |
| 2,364,474 | Rich | Dec. 5, 1944 |
| 2,367,614 | Rich | Jan. 16, 1945 |